US010859317B2

(12) United States Patent
Soppe et al.

(10) Patent No.: US 10,859,317 B2
(45) Date of Patent: Dec. 8, 2020

(54) APPARATUS AND METHOD FOR EVAPORATING LIQUIDS CONTAINING POTENTIALLY EXPLOSIVE IMPURITIES

(71) Applicant: Covestro Deutschland AG, Leverkusen (DE)

(72) Inventors: Alfred Soppe, Issum (DE); Jiyuan Sun, Shanghai (CN); Thorsten Leidig, Duisburg (DE); Thomas Runowski, Hilden (DE); Dieter Heitkamp, Burscheid (DE)

(73) Assignee: Covestro Deutschland AG, Leverkusen (DE)

( * ) Notice: Subject to any disclaimer, the term of this patent is extended or adjusted under 35 U.S.C. 154(b) by 0 days.

(21) Appl. No.: 15/503,515

(22) PCT Filed: Aug. 14, 2014

(86) PCT No.: PCT/CN2014/084399
§ 371 (c)(1),
(2) Date: Feb. 13, 2017

(87) PCT Pub. No.: WO2016/023209
PCT Pub. Date: Feb. 18, 2016

(65) Prior Publication Data
US 2017/0227294 A1 Aug. 10, 2017

(51) Int. Cl.
F28D 7/16 (2006.01)
F28F 9/22 (2006.01)
(Continued)

(52) U.S. Cl.
CPC ............ F28D 7/1623 (2013.01); B01D 1/04 (2013.01); F25B 39/02 (2013.01); F28D 7/0066 (2013.01);
(Continued)

(58) Field of Classification Search
CPC .. F28D 7/1623; F28D 7/0066; F28D 21/0017; F28D 2021/0064; F28D 7/06;
(Continued)

(56) References Cited

U.S. PATENT DOCUMENTS 3,048,373 A * 8/1962 Bauer ................. B01D 3/32
165/301
3,089,250 A * 5/1963 Irving ................. D06M 23/10
34/443

(Continued)

FOREIGN PATENT DOCUMENTS

CN 202973979 6/2013
CN 203249428 10/2013
(Continued)

OTHER PUBLICATIONS

The Chlorine Institute; Pamphlet 152; Safe Handling Of Chlorine Containing Nitrogen Trichloride; Edition 3; Jul. 2011.
(Continued)

Primary Examiner — Steven B McAllister
Assistant Examiner — Benjamin W Johnson
(74) Attorney, Agent, or Firm — N. Denise Brown

(57) ABSTRACT

The present invention relates to an apparatus and a method for evaporating liquids containing potentially explosive impurities of lower volatility than the actual liquid compound. The set-up of the evaporator according to the invention allows its operation with complete evaporation of a liquid without formation of a liquid sump of not yet evaporated liquid.

20 Claims, 1 Drawing Sheet

(51) Int. Cl.
*F28D 21/00* (2006.01)
*B01D 1/04* (2006.01)
*F25B 39/02* (2006.01)
*F28D 7/06* (2006.01)
*F28F 9/00* (2006.01)
*F28D 7/00* (2006.01)

(52) U.S. Cl.
CPC ............ *F28D 7/06* (2013.01); *F28D 21/0017* (2013.01); *F28F 9/00* (2013.01); *F28F 9/22* (2013.01); *F25B 2339/02* (2013.01); *F28D 2021/0064* (2013.01); *F28F 2265/00* (2013.01)

(58) Field of Classification Search
CPC ........ B01D 1/04; F25B 39/02; F25B 2339/02; F28F 9/00; F28F 9/22; F28F 2265/00
USPC ......................................................... 122/1 B
See application file for complete search history.

(56) References Cited

U.S. PATENT DOCUMENTS

| | | | | |
|---|---|---|---|---|
| 4,046,110 | A | 9/1977 | Fritz et al. | |
| 5,032,252 | A * | 7/1991 | Owen | B01J 8/1863 208/113 |
| 5,203,405 | A | 4/1993 | Gentry et al. | |
| 6,178,293 | B1 * | 1/2001 | Clasen | B01D 5/0009 165/104.29 |
| 2001/0017202 | A1 * | 8/2001 | Mitsumoto | B01J 19/002 165/174 |
| 2010/0107676 | A1 * | 5/2010 | Liu | F25B 39/02 62/304 |
| 2010/0276122 | A1 * | 11/2010 | Daly | B01D 5/0009 165/111 |
| 2011/0144381 | A1 * | 6/2011 | Doerr | B01D 3/148 560/347 |
| 2012/0017848 | A1 | 1/2012 | Brereton et al. | |
| 2012/0118545 | A1 | 5/2012 | Ayub et al. | |

FOREIGN PATENT DOCUMENTS

| | | | |
|---|---|---|---|
| EP | 2213367 | A1 * | 10/2008 |
| JP | 5024163 | A | 3/1975 |
| JP | 55115303 | U1 | 8/1980 |
| JP | 6119401 | U | 2/1986 |
| JP | 62280580 | | 12/1987 |
| JP | 2007275821 | A | 10/2007 |

OTHER PUBLICATIONS

EURO CHLOR GEST 75/47; 11th Edition; "Design and Operation of Chlorine Vaporisers"; Aug. 2012.
EURO CHLOR GEST 76/55; 12th Edition; "Maximum Levels of Nitrogen Trichloride in Liquid Chlorine"; Feb. 2012.
Roetzel, Wilfried et al; VDI-Warmeatlas (VDI Heat Atlas), 11th Edition; 2013; Chapter C; "Berechnung von Warmeubertragern" ("Thermal Design of Heat Exchangers"), VDI-Verlag; ISBN 9783642199806. English Language Version.
Green, Don et al; Perry's Chemical Engineers' Handbook; 8th edition; 2008; McGraw-Hill Professional, ISBN 9780071422949; Chapter 11; "Thermal Design Of Heat-Transfer Equipment".

* cited by examiner

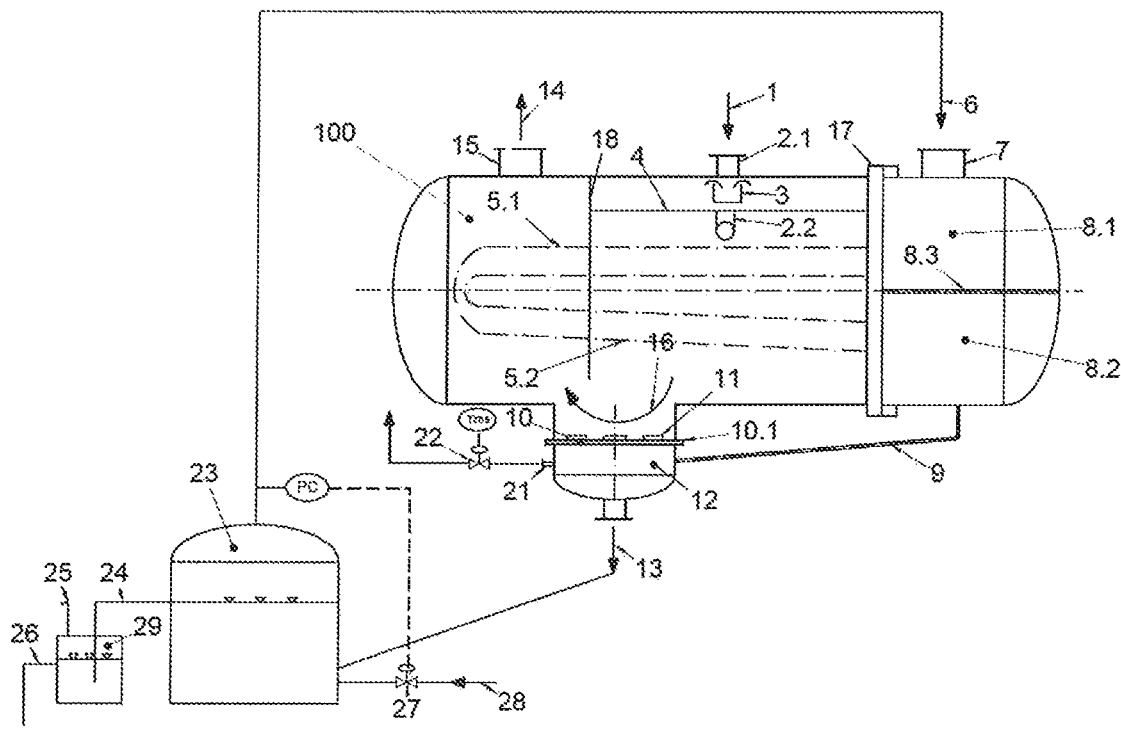
FIG. 1
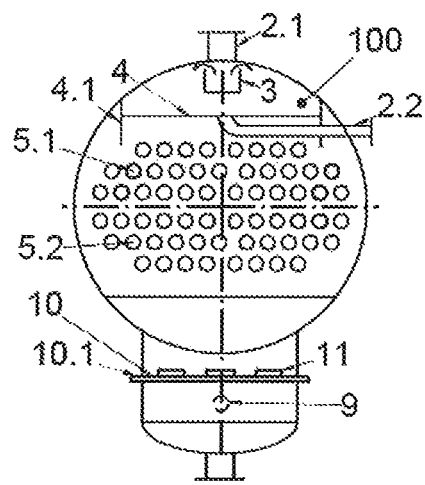
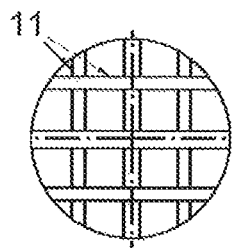
FIG. 2a (top) and 2b (bottom)

APPARATUS AND METHOD FOR EVAPORATING LIQUIDS CONTAINING POTENTIALLY EXPLOSIVE IMPURITIES

CROSS-REFERENCE TO RELATED APPLICATIONS

This application is a national stage application under 35 U.S.C. § 371 of PCT/CN2014/084399, filed Aug. 14, 2014, which is incorporated by reference herein.

FIELD OF THE INVENTION

The present invention relates to an apparatus and a method for evaporating liquids containing potentially explosive impurities of lower volatility than the actual liquid compound. The set-up of the evaporator according to the invention allows its operation with complete evaporation of a liquid without formation of a liquid sump of not yet evaporated liquid.

BACKGROUND OF THE INVENTION

In many industrial processes, liquids have to be evaporated at certain stages. When evaporating a pure liquid, the gas phase necessarily has the same composition as the liquid not yet evaporated. However, the various compounds employed in large-scale industrial processes often contain significant amount of impurities, some of which may have potential explosive hazards. Usually, for a given temperature and pressure, a critical threshold concentration exists below which the presence of the potential explosive impurity is not dangerous. Thus, care is taken in industrial processes to keep the concentration of such impurities below said threshold. However, even if a liquid containing such an impurity only in a concentration which is not dangerous when being stored at ambient temperature and pressure, the situation can change completely when said liquid is to be evaporated. Firstly, in most cases in order to effect evaporation the temperature is risen, i.e. the liquid is heated. However, at a higher temperature of the liquid the critical threshold concentration of the impurity might be much lower than at ambient temperature. Secondly, even if evaporation is only effected by lowering the pressure without increasing the temperature, problems can arise due to accumulation of the impurity in the not yet evaporated liquid:

If an impurity has a boiling point very similar to that of the actual compound, the gas phase formed upon evaporation will have a composition essentially identical to that of the not yet evaporated liquid phase. However, quite often an impurity has a boiling point which is significantly lower (low-boiling impurity) or higher (high-boiling impurity) than that of the actual compound. In the first case, upon evaporation of the liquid, a gas phase forms initially which is enriched in the impurity, leaving behind a not yet evaporated liquid phase depleted in the impurity. In the latter case, a gas phase forms initially which is enriched in the actual compound to be evaporated, leaving behind a not yet evaporated liquid phase which is enriched in the impurity. If in the latter case the impurity is a compound having potentially explosive hazards, this accumulation of the impurity in the liquid phase can become very dangerous. Evaporating a liquid which contains a potentially explosive impurity with lower volatility than the actual target compound is thus always associated with risks. Such a situation can occur, for example, when evaporating liquid chlorine (which may contain nitrogen trichloride as a potentially explosive impurity), liquid dinitro toluene (which may contain trinitro toluene, nitro cresols and the like as potentially explosive impurities) and liquid ethers (which may contain peroxides).

There are several approaches known in the art to address this problem:

For example, in the case of the evaporation of liquid chlorine containing nitrogen trichloride ($NCl_3$)—a highly reactive material that can decompose exothermally, giving rise to an explosion in the worst case, when exceeding a threshold concentration—, usually special care has to be taken to avoid the accumulation of high concentrations of $NCl_3$ in liquid chlorine. In this respect, it is preferred to limit the concentration of nitrogen trichloride in liquid chlorine to a value of less than 3% by weight, more preferably to a value of less than 1% by weight, most preferably to a value of less than 0.1% by weight, in each case based on the total weight of chlorine and any impurity present therein. This can be achieved either by (1) limiting the $NCl_3$ concentration in the liquid chlorine feed to the evaporator to an extremely low level or by (2) avoiding the accumulation in the evaporator or by a combination of both measures. In the first case (1), the composition of the chlorine feed has to be analysed regularly and, if $NCl_3$ concentrations too high are detected, adequate countermeasures have to be taken, such as, for example, blending the impure chlorine with chlorine of higher purity, decomposing ammonia compounds in the electrolysis brine circuit before $NCl_3$ is formed from it or decomposing $NCl_3$ in liquid chlorine by high temperature. All these methods have only very limited effectiveness. Ultimately, in an extreme case, the evaporator has to be shut down until chlorine of high enough quality is available again. In the second case (2), the liquid accumulating at the bottom of the evaporator must be withdrawn continuously or at regular intervals and be safely discarded. All these measures suffer from obvious disadvantages and make the whole process less economic.

Obviously, if it were possible to completely evaporate the liquid rapidly without formation of a liquid sump enriched in the impurity, the gas phase would always have the same composition as the liquid phase, hence, if the concentration of the impurity in the original liquid phase is below the critical threshold and the temperature of the liquid is not risen too much in the evaporation process, usually no danger exists. However, the vaporizers typically used in chlorine processes are vertical tube bundle-type, bayonet bundle-type, double envelope-type and kettle-type evaporators (Euro Chlor GEST 75/47), none of which can be operated without any formation of a sump of liquid chlorine, which leads to a potential explosive risk by accumulation of $NCl_3$ in the liquid chlorine sump as explained above. Only the coil-in-bath-type evaporator could be operated without accumulation of liquid chlorine in a sump. But this type of evaporator is, due to its special design, usually very limited in the evaporation capacity and hence not suitable for an economic large-scale production.

The destruction of $NCl_3$ is also one way to deal with chorine containing $NCl_3$. Known embodiments involve (see Safe Handling of Chlorine Containing Nitrogen Trichloride, Chlorine Institute Pamphlet 152) destruction of $NCl_3$ using catalysts, ultraviolet light, thermal methods and adding reducing agents and the like. These methods can safely destroy $NCl_3$ only with certain limitations. Catalytic destruction has so far not gone beyond the laboratory stage. The ultraviolet light method is only applicable to gaseous chlorine streams. The thermal method is temperature and residence time related and hence limited by flow rate, temperature and equipment scale. Adding reducing agents still requires a step of lowering the concentrations of the impurities of the chlorine stream and furthermore has an undesirable impact on the quality of the final product.

Similar approaches with similar drawbacks exist in case of the other examples of liquids containing potentially explosive impurities mentioned above. The problems and drawbacks mentioned are sometimes so paramount that they prevent further development in a technical area. For example, it is well-known that gas-phase production processes offer various principle advantages over liquid phase production processes. And yet, to the best of the inventors' knowledge, no large-scale industrial dinitro toluene gas phase hydrogenation plant operating with dinitro toluene of ordinary technical purity exists, although the gas phase hydrogenation of dinitro toluene was described in principle long ago. This is in sharp contrast to the case of mononitro benzene, the hydrogenation of which in the gas phase has been industrial standard for a long time. It is the inventors' belief that this remarkable difference is, at least in part, to be attributed to the problem of safely evaporating dinitro toluene of technical purity in an economic manner.

Thus, a need existed in the art for an approach to evaporate a liquid containing a potentially explosive impurity, which does not necessitate maintaining the concentration of the impurity at an extremely low level, which minimises or even better prevents losses of the actual compound to be evaporated, and which is safe as well as economic on an industrial large scale.

SUMMARY OF THE INVENTION

Therefore, in order to satisfy this need, according to one aspect of the invention, an evaporation apparatus (100) (hereinafter also referred to as evaporator) is provided which comprises:
(i) At least one inlet (2) for a liquid (1) to be evaporated, the inlet(s) (2) being located at the top of the evaporation apparatus (2.1) and/or on a side of the evaporation apparatus (2.2);
(ii) Optionally, in a preferred embodiment, a seal pot (3) into which any inlet (2.1) immerses;
(iii) A liquid distributor (4), optionally equipped with guiding vanes (4.1), which is located
    underneath any inlet (2.1) or, if present, underneath the seal pot (3), and/or
    above any inlet (2.2), the liquid distributor (4) being connected to the inlet (2.2);
(iv) An upper heating unit (5.1), preferably a bundle of heatable tubes, arranged horizontally in the evaporation apparatus underneath the liquid distributor (4);
(v) A lower heating unit (5.2), preferably a lower bundle of heatable tubes, arranged horizontally or with a downward slope in the evaporation apparatus underneath the upper heating unit (5.1);
(vi) A heatable flat plate (10) arranged horizontally in the bottom of the evaporation apparatus underneath the lower heating unit (5.2);
(vii) An outlet (15) for the evaporated liquid (i.e. the desired gas stream) (14).

According to another aspect of the invention, a method for operating the evaporation apparatus according to the invention is provided, which comprises:
(I) Introducing a liquid (1) to be evaporated through
    an inlet (2.1), preferably via a seal pot (3), and/or
    through an inlet (2.2)
onto the liquid distributor (4) and from there onto the upper heating unit (5.1), which is heated, preferably steam-heated, whereby the mass flow of the liquid (1) is chosen such that the design evaporation capacity provided by the upper heating unit (5.1) is not exceeded;
(II) Guiding any not evaporated droplets onto the heated, preferably steam-heated, flat plate (10);
(III) Discharging the evaporated liquid (i.e. the desired gas stream) (14) via the outlet (15).

The "liquid (1)" may be any liquid which can be evaporated. Preference is given to liquids containing potentially hazardous compounds with respect to the risk of an explosion. Particular preference is given to liquids selected from the group consisting of chlorine, dinitro toluene and ethers, chlorine being the most preferred liquid. In case of chlorine, the concentration of nitrogen trichloride contained therein is preferably of from 20 ppm to 250 ppm, more preferably of from 30 ppm to 140 ppm, referring to the total weight of the chlorine including nitrogen trichloride and any other impurity which may be present.

A "heating unit" within the meaning of the present invention encompasses any device suitable for effecting evaporation of a liquid which gets in contact with said heating unit. The upper heating unit (5.1) is arranged horizontally, which means that the longitudinal side of this heating unit is arranged in this manner (see also FIG. 1). The lower heating unit (5.2) may, in one embodiment of the invention, be also arranged in a horizontal manner. Under certain circumstances it may, however, be advantageous to deviate from the horizontal orientation in case of the lower heating unit (5.1). In particular, as will be described below in more detail, it can be advantageous to give the lower heating unit (5.2) a downward slope of from >0.7°, preferably of from 0.8° to 5°, more preferably of from 1° to 3°.

The design evaporation capacity is determined by the theoretical heat transfer area necessary to completely evaporate the liquid (1). The theoretical heat transfer area can be calculated by the skilled person dependent on the related evaporating conditions such as nature, pressure and temperature of the liquid (1), shape, arrangement, length, slope and dimensions of the pipes guiding the liquid (1) to the evaporation apparatus etc. using methods known in the art. Suitable calculation methods are described in *VDI-Wärmeatlas*, 11$^{th}$ edition 2013, Chapter C, "*Berechnung von Wärmeübertragern*", "VDI-Verlag", ISBN 9783642199806, and *Perry's Chemical Engineers' Handbook*, Don W. Green, Robert H. Perry, eighth edition 2008, McGraw-Hill Professional, ISBN 9780071422949, Chapter 11 "*Thermal Design of heat transfer equipment*".

According to the operating method of the present invention, this theoretical heat transfer area is entirely provided by the upper bundle of tubes (5.1). Thus, the lower bundle of the heated tubes essentially (5.2) acts as an overheating zone.

BRIEF DESCRIPTION OF THE DRAWINGS

Various embodiments of the invention are described hereinafter. Different embodiments can be combined with one another as desired, unless the context suggests otherwise.

FIG. 1 shows a preferred embodiment of an evaporating apparatus (100) according to the invention.

FIG. 2a shows a schematic cross-sectional view of an evaporating apparatus (100) according to the invention.

FIG. 2b shows an enhanced plan view on the top surface of the heatable flat plate (10) of the evaporator (100) shown in FIG. 2a.

DETAILED DESCRIPTION OF THE INVENTION

Suitable inlets (2) are known to the skilled person, for example feed pipes, which are preferably equipped with shut-off devices. In one embodiment of the invention, the inlet (2) is located at the top of the evaporator (inlet type (2.1)). In a preferred embodiment, the inlet (2.1) is dipped into a seal pot (3) which acts as a hydraulic lock and thus prevents a back-flow of evaporated liquid into the inlet (2).

In another embodiment of the invention, the evaporator comprises an inlet (2.2) which is located at a side of the evaporation apparatus, in which case the liquid distributor (4) is located above said inlet (2.2) and is connected with said inlet (2.2). In this context, the term "connected" means that said inlet (2.2) is arranged with respect to the liquid distributor (4) such that any liquid (1) which is introduced into the inlet (2.2) can flow through the inlet (2.2) upwards onto the liquid distributor (4) and from there downwards onto the upper heating unit (5.1). This embodiment is especially useful in cases with varying liquid flow (1), because in such cases a seal pot (3) might not be sufficient to safely avoid the back-flow of evaporated liquid (1) into the feed piping system connected to the evaporator. In all cases where this effect might occur and disturb the process operation, the liquid inlet (2.2) can be used to feed the liquid (1). As a result of the connection between the inlet (2.2) and the liquid distributor (4), a liquid leg is formed in the inlet (2.2) and the piping system which connects the inlet (2.2) to the reservoir of the liquid (1). This arrangement will safely avoid any disturbance of the process by the backwards movement of gas bubbles formed by evaporated liquid (1).

It is also possible to construct the evaporator such that it comprises both kinds of inlets, (2.1) and (2.2). Preferably, only one kind of inlet is used at a time, the other being shut-off. The choice which kind of inlet is actually used depends on the operational circumstances. For example, if no great reservoir of liquid (1) is available, it is preferred to feed the liquid (1) via inlet (2.1) into the evaporator. Thereby pressure is created without an additional pump. If, on the other hand, large amounts of liquid (1) are to be evaporated, e.g. from a buffer tank, it is preferred to feed these through an inlet (2.2) into the evaporator.

The liquid distributor (4) ensures even distribution of the liquid (1) over the upper heating unit (5.1). Suitable liquid distributors are known in the art and are for example described in Perry's Chemical Engineers' Handbook, Perry's chemical engineers' handbook, Don W. Green, Robert H. Perry, eighth edition 2008, McGraw-Hill Professional, ISBN 9780071422949, Chapter 14.4.5, "*Distributors*".

In a preferred embodiment, the liquid distributor (4) is a distribution tray. In a further alternative design, the liquid distributor (4) is equipped with downwardly directed guiding vanes (4.1) which avoid that liquid leaving the liquid distributor may be spread directly to the shell of the evaporator where it might by-pass the heating area.

The heating units (5.1) and (5.2) are designed such that they can be heated sufficiently to evaporate and overheat the liquid (1), respectively. Heating can be accomplished, for example, electrically, or by passing a suitable heating medium such as steam, a salt melt, hot water, hot oil or hot combustion gases through the inside of the heating units (5.1) and (5.2). Steam-heating, however, is preferred.

Suitable embodiments of heating units (5.1) and (5.2) are, for example, heater coils or heatable tubes. In the case of heatable tubes, these have either a plain surface or a structured surface (fins, ribs, grooves, etc.) to improve the heat transfer values. In a preferred embodiment of the evaporation apparatus, the heating units (5.1) and (5.2) are bundles of heatable tubes, each bundle comprising of from 10 to 2,000 tubes, preferably of from 100 to 1,000 tubes, more preferably of from 200 to 500 tubes. It is preferred that the layers of heatable tubes which form the tube bundles are arranged such that the gaps between individual tubes of one layer of tubes are covered by tubes of the layer of tubes above and/or underneath it as shown schematically in FIG. 2*a*.

In a particularly preferred variant of the embodiment with heatable tubes as heating units, the upper tube bundle (5.1) and the lower tube bundle (5.2) are connected to each other with a bended U-shaped connecting piece, i.e., the respective upper and lower tubes constitute two parts of on piece of equipment, a U-shaped tube bundle (5) with an upper part (5.1) and a lower part (5.2). This design renders the installation of an expansion joint in the heat exchanger shell for compensating thermal stresses unnecessary. Such a compensator is usually a weak point in the mechanical design and would furthermore bear the risk of formation of a sump of not evaporated liquid (1).

In a further alternative design of this embodiment, the upper part (5.1) of the U-shaped tube bundle is aligned horizontally, which avoids a deflection of liquid chlorine droplets alongside the tubes, whereas the lower part (5.2) has a downward slope of from >0.7°, preferably of from 0.8° to 5°, more preferably of from 1° to 3°. If the tube bundle (5) is heated by steam, which is the most preferred heating mode, the drainage of steam condensate from the tubes is improved thereby.

The horizontally-arranged upper heating unit (5.1) acts as heating area to evaporate the liquid (1), whilst the lower heating unit (5.2) serves to overheat the gaseous stream of evaporated liquid. It is preferred that the lower heating unit (5.2) has the same theoretical heating capacity as the upper heating unit (5.2).

In a preferred embodiment of the invention, a baffle plate (18) having slots for the heating units (5.1) and (5.2) is arranged in the evaporator vertically above the heatable flat plate (10) in a position between the inlet (1) and the outlet (15) such that the heating units (5.1) and (5.2) run through the slots and the baffle plate's upper end extends to the inner top shell of the evaporator. The lower end of the baffle plate may extend to a position immediately underneath the lower end of the lower heating unit (5.1) so as to just enclose the lowest part of the lower heating unit (5.1). It may, in a preferred embodiment described in more detail below, also significantly extend into the section of the evaporator which is underneath the lower heating unit (5.2) as shown in FIG. 1. However, in neither case does the lower end of the baffle plate extend completely to the heatable flat plate (10) itself. By this arrangement, the evaporator is separated into two areas:

A first area which is dedicated to the evaporation of the introduced liquid (1) and in which the gaseous stream of evaporated liquid flows downwards co-currently with not-yet evaporated liquid droplets (i.e. the area on the side of the baffle plate (18) which faces the inlet (2)) and a second area where the evaporated liquid is directed upwards towards the outlet (15) on top of the evaporator (i.e. the area on the side of the baffle plate (18) which faces the outlet (15)). In the second area, the evaporated liquid is overheated before it leaves the evaporator via the outlet (15).

When the baffle plate (18) is used in combination with a U-shaped tube bundle (5), the baffle plate (18) is preferably located in the position which separates the straight parts (5.1 and 5.2) of the tube bundle (5) from the bended connecting piece as shown in FIG. 1.

The horizontally-aligned heatable flat plate (10) serves as a safety measure which ensures evaporation of any non-evaporated liquid droplets which should pass the two heating units (5.1) and (5.2). Under ordinary operating conditions, it is not to be expected that any droplets of liquid (1) should reach the bottom of the evaporator. However, in case of irregular operating conditions like, for example, a failure or shortage of the heat supply to the heating units (5.1) and (5.2), it might happen that some droplets of liquid (1) pass the heating units (5.1) and (5.2). Single droplets of liquid (1) which pass the heating units of the evaporator will immediately evaporate when touching the surface of the plate (10), without a possibility for accumulating dangerous amounts of hazardous substances. To this end, the flat plate (10) is heated, preferably from below with steam, most preferably with saturated steam. A larger amount of liquid (1), will, due to the horizontally-leveled alignment of the flat plate (10), evenly distribute over the surface of the plate (10). By the horizontal alignment it is avoided that liquid (1) will collect in one corner of the heated plate. A possible exceeding of the area-related acceptable threshold concentration of possibly explosive substances in said liquid (1) is thereby safely avoided. (The area-related threshold concentration refers to the amount of the possibly explosive compound per area. In case of nitrogen trichloride in chlorine, a value of 1.5 $g/cm^2$, preferably of 0.3 $g/cm^2$, should not be exceeded; see *Euro Chlor GEST* 76/55. More reference values for acceptable concentrations of explosive impurities can be found in the respective technical literature.) The liquid (1) which is collected on the horizontally-aligned flat plate (10) will then be evaporated again and leave the evaporator together with the main flow (14) of evaporated liquid through the outlet (15). In order to ensure that the flat plate (10) is aligned as near an ideal horizontal orientation as possible, it is preferred that the flat plate (10) be equipped with a visible circumferential edge 10.1 as shown in FIG. 1.

It is preferred to construct the flat plate (10) with sufficient mechanical strength in order to avoid any damage in case hazardous impurities (such as, for example, $NCl_3$ in chlorine), although only present in an amount not yet sufficient to cause an explosion, should decompose in an exothermic reaction. The impact of such an accelerated decomposition can be furthermore limited by separating the surface area of the horizontally-aligned flat plate (10) into smaller sub areas by means of installation of curbs (11) on the surface of the plate (10). These curbs will stop the propagation of a starting decomposition and thus mitigate the hazardous effects any decomposition inevitably has. It is preferred that the curbs are of a relatively low height such as from 1 mm to 5 mm.

In a preferred embodiment, the gaseous stream of evaporated liquid (1) is directed to flow compulsorily over the surface of the horizontally-aligned heatable flat plate (10) by means of a suitable guiding device known to the skilled person, such as a guide plate, a guide tube, a baffle plate and the like. In doing so, the evaporating liquid (1) on the surface of the flat plate (10) is kept in a thermodynamic equilibrium with the gaseous stream of already evaporated liquid (1), thereby avoiding that the flat plate (10) might act as a second distillation stage, which would lead to a furthermore increased concentration of hazardous substances in the remaining liquid (1). In a preferred design, the desired direction of the gas flow over the surface of the horizontally-aligned heatable flat plate (10) is obtained by a direct extension of the above mentioned baffle plate (18) which separates the pipe section of the evaporator into the section of the evaporator which is underneath the lower heating unit (5.2) as shown in FIG. 1.

The method for operating the evaporation apparatus according to the invention is primarily characterized in that the mass flow of the liquid (1) to be evaporated is chosen such that the design theoretical evaporation capacity provided by the upper heating unit (5.1) is not exceeded. In doing so, the probability of the formation of a liquid sump of non-evaporated liquid in the bottom of the evaporator is greatly reduced and normally not to be expected at all. In the preferred embodiment of a U-shaped tube bundle (5) with an upper part (5.1) and a lower part (5.1), the upper heating unit (5.1) is considered to be encompassed only by the straight part of the tube bundle (5.1), i.e. the bended connecting piece combining the upper and lower part to form one piece of equipment is, for the purpose of determining the theoretical design evaporation capacity, not considered to be part of the upper heating unit (5.1).

To this end, the mass flow of the liquid (1) to be evaporated must be adjusted to a given theoretical evaporation capacity of the upper heating unit (5.1). The theoretical evaporation capacity of the heating unit depends on various factors, such as the surface area and surface shape of the heating unit, the amount of heat supplied per hour to the heating unit, temperature of the heating medium, physical data of the liquid to be evaporated etc. All these factors are known for a given design of an evaporator, so that the skilled person can easily calculate the theoretical evaporation capacity of the upper heating unit (5.1).

The supply of heat to the heating units (5.1) and (5.2) is preferably chosen such that no decomposition reactions or any other undesired reactions (such as, in case of a potentially corrosive liquid (1), corrosion of the evaporator material) are to be expected. For example, in the case of the evaporation of liquid chlorine using steam as heat source, this means that the absolute pressure of the steam used is preferably not higher than 1.98 bar, more preferably not higher than 1.43 bar, even more preferably not more than 1.10 bar, at which pressure the chlorine can be safely handled within an operating temperature equal to or below 120° C. or, respectively, equal to or below 110° C., or, respectively, equal to or below 102.5° C.

A particularly preferred embodiment of an evaporator (100) according to the invention is described hereinafter with reference to the drawings:

The evaporator is equipped with a seal pot into (3) which the inlet (2.1) immerses. The liquid distributor (4) is equipped with guiding vanes (4.1) (cf. FIG. 2a) to avoid that liquid droplets can bypass the tube bundle by being sprinkled to the gap between tube bundle and evaporator shell.

The heating units (5.1) and (5.2) are combined in one U-shaped tube bundle with an upper part (5.1) and a lower part (5.2). For the sake of clarity, only one upper part and one lower part are shown in FIG. 1. These represent in fact a plurality of tubes as shown in FIG. 2a. The liquid distributor (4) connects a tube sheet (17) holding the tubes and a baffle plate (18) guiding the flow of gaseous stream of evaporated liquid (1) and any not-yet evaporated liquid (1) onto the top surface of the flat plate (10). The latter is equipped with curbs (11) as can be seen more clearly in FIG. 2b and a circumferential edge (10.1) visible from the outside which allows easy horizontal levelling during installation of the evaporator.

The tube bundles (5.1) and (5.2) are heated with steam (6) produced in steam generation pot (23). The steam (6) is introduced via steam inlet (7) into the upper chamber (8.1), from which it flows through the upper tube bundle (5.1) and after that through the lower tube bundle (5.2), before it enters the lower chamber (8.2), both chambers being separated by a Leidig: separating plate (8.3). The heating chamber (12) below the flat plate (10) is fed directly with steam and condensate out of the lower chamber (8.2) via connecting pipe (9) which ensures always an uninterrupted heat supply. In the heating chamber (12), the residual steam vapour provides additional heating energy through the flat plate (10) to the shell side of the evaporator in order to evaporate any liquid chlorine with $NCl_3$ which might have accumulated on the top surface of the flat plate (10). The vaporized chlorine stream (16) sweeps above the flat plate (10). Stream (16) is further superheated by the U-shaped part of the tube bundle and then leaves the evaporator through nozzle (15).

The condensate stream (13) flows back freely to the low pressure steam generation pot (23). The condensate flows over into condensate pot (29) via overflow pipe (24) which is dipped under the condensate level to prevent steam losses. The vent nozzle (21) is set to release any inert gas via a time-control valve (22).

EXAMPLES

Example 1 (Simulation: Evaporation of Liquid Chlorine Containing Nitrogen Trichloride)

In the evaporator shown in FIG. 1, stream (1), liquid chlorine containing of from 10 ppm to 20 ppm of nitrogen trichloride ($NCl_3$) is fed at an absolute pressure of 5,000 mbar to inlet (2.1). The inlet (2.2) is not used and is shut-off. The upper part of the tube bundle (5.1) is designed sufficiently big to provide enough heat to completely evaporate the chlorine which is supplied with a feed rate of about 5,000 kg/h. Stream (1) out of seal pot (3) and is evenly distributed via liquid distributor (4) onto the upper part (5.1) of the U-shaped tube bundle. Guiding vanes (4.1) (cf. FIG. 2a) at the side of the liquid distributor (4) avoid that liquid chlorine droplets can bypass the tube bundle by being sprinkled to the gap between tube bundle and evaporator shell. Steam is introduced via line (28) and control valve (27) into the low pressure steam generation pot (23), where the steam is adjusted to the desired pressure and de-overheated (i.e. cooled to its saturation temperature). The saturated steam vapour (6) having an absolute pressure of about 1.1 bar coming from the low pressure steam generation pot (23) is introduced into the evaporator (100) via inlet (7). Steam condensate from the heating process leaves the evaporator (100) via outlet pipe (13) back to the steam generation pot (23), where it is partially used to de-overheat the introduced overheated steam. The valve (22) can be used to vent the steam system to the atmosphere to avoid the accumulation of inert gases in the steam system. Excess condensate is discharged via discharge pipe (24) into the condensate pot (29). The liquid level in the condensate pot (29) in combination with the length of the discharge pipe (24) ensure that the saturated steam pressure and thus the evaporation temperature is not higher than the chlorine process design temperature. From here it is discharged via free overflow (26). The condensate pot is vented to the atmosphere by the vent pipe (25). The "overdesigned" evaporator tends to evaporate all the liquid chlorine (1) upon contact with the upper part of U-shaped tube bundle (5.1).

The partially condensed steam (6) is carried out by steam vapour flow to the lower part of the U-shaped tube bundle (5.2), in which the condensate can flow by both bundle (5.2) via lower channel head chamber (8.2) and connection pipe (9) to the additional heating chamber (12). In the latter, the residual steam vapour provides additional heating energy through the flat plate (10) to the shell side of the evaporator in order to evaporate any liquid chlorine with $NCl_3$ which might have accumulated on the top surface of the flat plate (10).

The vaporized chlorine stream (16) sweeps above the flat plate (10). Stream (16) is further superheated by the U-shaped part of the tube bundle and then leaves the evaporator through nozzle (15).

The invention claimed is:

1. An evaporation apparatus for evaporating a liquid into a gas stream, comprising:
   (i) an evaporation housing including a top part, a bottom part and a side part;
   (ii) at least one inlet for a liquid that is to be evaporated, wherein the at least one inlet comprises one of embodiments (a), (b) or (c):
      (a) an inlet located in the top part of the evaporation housing,
      (b) an inlet located on the side part of the evaporation housing, or
      (c) an inlet located in the top part of the evaporation housing and an inlet located on the side part of the evaporation housing;
   (iii) a liquid distributor, which is located
      in embodiment (a): underneath the inlet located in the top part of the evaporation housing, in embodiment (b): above the inlet located on the side part of the evaporation housing, with the liquid distributor being connected to the inlet located on the side part of the evaporation housing, and in embodiment (c): underneath the inlet located in the top part of the evaporation housing and above the inlet located on the side part of the evaporation housing, with the liquid distributor being connected to the inlet located on the side part of the evaporation housing;
   (iv) an upper heating unit arranged horizontally in the evaporation housing underneath the liquid distributor;
   (v) a lower heating unit arranged horizontally or with a downward slope from a horizontal plane in the evaporation housing underneath the upper heating unit;
   (vi) a heatable flat plate arranged horizontally in the evaporation housing that is disposed underneath the lower heating unit and in the bottom part of the evaporation housing; and
   (vii) an outlet for a gas stream produced by evaporation of the liquid;
      wherein the liquid distributor is equipped with downwardly directed guiding vanes which prevent liquid leaving the liquid distributor from being spread directly onto the evaporation housing.

2. The evaporation apparatus of claim 1, wherein the upper heating unit comprises an upper tube bundle and the lower heating unit comprises a lower tube bundle.

3. The evaporation apparatus of claim 2, wherein the upper tube bundle and the lower tube bundle are connected to each other with a bent U-shaped connecting piece, thereby forming a U-shaped tube bundle with an upper tube bundle and a lower tube bundle.

4. The evaporation apparatus of claim 2, wherein the lower tube bundle has a downward slope from the horizontal plane of from >0.7° to 5°.

5. The evaporation apparatus of claim 2, wherein the upper tube bundle and the lower tube bundle each comprise at least two layers of individual heatable tubes which are arranged such that gaps between individual tubes of one layer of heatable tubes are covered by individual tubes of another layer of heatable tubes directly above and/or directly underneath it.

6. The evaporation apparatus of claim 1, further comprising a baffle plate having an upper end and a lower end, and slots for the upper and lower heating units, wherein said baffle plate is arranged vertically above the heatable flat plate in a position between the inlet and the outlet such that the upper and lower heating units pass through the slots, and the baffle plate's upper end extends to the top part of the evaporation housing.

7. The evaporation apparatus of claim 1, further comprising a guiding device arranged in the evaporation apparatus so as to direct the gas stream of evaporated liquid compulsorily over the surface of the heatable flat plate which is arranged horizontally in the evaporation apparatus.

8. The evaporation apparatus of claim 7, wherein the guiding device comprises a baffle plate having an upper end and a lower end, and slots for the upper and lower heating units, wherein said baffle plate is arranged vertically above the heatable flat plate in a position between the inlet and the outlet such that the upper and lower heating units pass through the slots, and the baffle plate's upper end extends to the top part of the evaporation housing and the baffle plate's lower end extends below the lower heating unit.

9. The evaporation apparatus of claim 1, wherein the heatable flat plate has a circumferential edge which extends beyond the evaporation housing and is visible from outside of the evaporation housing.

10. The evaporation apparatus of claim 1, wherein the liquid comprises at least one of chlorine, dinitro toluene, and ethers.

11. A method for operating the evaporation apparatus according to claim 1, comprising:
 (I) introducing a liquid to be evaporated through
  (a) an inlet located in the top part of the evaporation housing,
  (b) an inlet located on the side part of the evaporation housing, or
  (c) an inlet located in the top part of the evaporation housing and an inlet located on the side part of the evaporation housing onto the liquid distributor, and then onto the upper heating unit which is heated, wherein the liquid to be evaporated is introduced with a mass flow rate that is adjusted to design evaporation capacity of the upper heating unit such that a gaseous stream of evaporated liquid is formed;
 (II) guiding the gaseous stream of evaporated liquid and any droplets of liquid which did not evaporate onto the heatable flat plate, which is heated to evaporate any droplets of liquid, thereby forming a second gaseous stream comprising the gaseous stream of evaporated liquid and any gaseous stream produced by evaporating previously not evaporated droplets of liquid; and
 (III) discharging the second gaseous stream from the outlet.

12. The method according to claim 11, wherein the upper and lower heating units are steam-heated.

13. The method according to claim 11, wherein the heatable flat plate is steam-heated.

14. The method according to claim 11, wherein the liquid comprises at least one of chlorine, dinitro toluene, and ethers.

15. The evaporation apparatus of claim 1, comprising an inlet located in the top part of the evaporation housing, wherein the evaporation apparatus additionally comprises a seal pot into which said inlet located in the top part of the evaporation housing immerses, and wherein said liquid distributor is located under said seal pot.

16. The method of claim 11, wherein the liquid to be evaporated is introduced through (e an inlet located in the top part of the evaporation housing.

17. The evaporation apparatus of claim 1, wherein the lower tube bundle has a downward slope from the horizontal plane of from 0.8° to 5°.

18. The evaporation apparatus of claim 1, wherein the lower tube bundle has a downward slope from the horizontal plane of from 1° to 3°.

19. The method of claim 16, wherein the liquid to be evaporated is introduced via a seal pot.

20. The method of claim 11, wherein the liquid to be evaporated is introduced through an inlet located on a side part of the evaporation housing.

* * * * *